(12) United States Patent
Kawakita et al.

(10) Patent No.: US 8,643,984 B2
(45) Date of Patent: Feb. 4, 2014

(54) ENGINE SYSTEM IN WHICH TRANSFORMER IS ARRANGED IN INDEPENDENT VENTILATION PATH

(75) Inventors: Keisuke Kawakita, Osaka (JP);
Toshinobu Fujisawa, Osaka (JP);
Tatsuya Kawano, Osaka (JP); Masaaki Ono, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 47 days.

(21) Appl. No.: 13/391,715

(22) PCT Filed: Jun. 21, 2010

(86) PCT No.: PCT/JP2010/060444
§ 371 (c)(1),
(2), (4) Date: Feb. 22, 2012

(87) PCT Pub. No.: WO2011/024543
PCT Pub. Date: Mar. 3, 2011

(65) Prior Publication Data
US 2012/0146465 A1 Jun. 14, 2012

(30) Foreign Application Priority Data
Aug. 27, 2009 (JP) ................................. 2009-196583

(51) Int. Cl.
*H02H 7/00* (2006.01)
(52) U.S. Cl.
USPC .......................................................... 361/37
(58) Field of Classification Search
USPC .......................................................... 361/37
See application file for complete search history.

(56) References Cited

U.S. PATENT DOCUMENTS

| 2,917,701 | A | * | 12/1959 | Salton | 361/37 |
| 4,146,112 | A | * | 3/1979 | Usry | 181/202 |
| 5,483,417 | A | * | 1/1996 | Tanimizu | 361/611 |
| 7,958,717 | B2 | * | 6/2011 | Nakano et al. | 60/39.83 |
| 8,284,006 | B2 | * | 10/2012 | Bacarisse | 336/90 |
| 2011/0043312 | A1 | * | 2/2011 | Yang | 336/90 |

FOREIGN PATENT DOCUMENTS

| JP | 3-110142 U | 11/1991 |
| JP | 06-501760 A | 2/1994 |
| JP | 11-270339 A | 10/1999 |

(Continued)

OTHER PUBLICATIONS

Office Action mailed May 7, 2013, issued for the corresponding Japanese patent application No. 2009-196583.

(Continued)

*Primary Examiner* — Scott Bauer
(74) *Attorney, Agent, or Firm* — Edwards Wildman Palmer LLP

(57) ABSTRACT

According to the present invention, even in the case of addition of a transformer for using an engine system with an AC power supply different from the expected voltage of an electrical device, there is substantially no change in the thermal balance in a package due to the presence or absence of the transformer. In the present invention, an engine 2 and an electrical device for driving the engine system are housed in a package 1. In order for a transformer 20 whose primary side is an AC power supply and whose secondary side is the expected voltage of the electrical device for driving the engine system to be housed in the package, an intake port, an exhaust port, and a ventilation fan for cooling the transformer are provided in a ventilation path that is independent from other devices.

6 Claims, 9 Drawing Sheets

(56) References Cited

FOREIGN PATENT DOCUMENTS

| | | | |
|---|---|---|---|
| JP | 2002-004942 | A | 1/2002 |
| JP | 2002-242760 | A | 8/2002 |
| JP | 2006-046239 | A | 2/2006 |
| JP | 2007104737 | A * | 4/2007 |
| JP | 2007-224892 | A | 9/2007 |
| JP | 2008-082204 | A | 4/2008 |
| JP | 2009-047053 | A | 3/2009 |
| WO | WO-93/04272 | A1 | 3/1993 |
| WO | WO-02/065620 | A1 | 8/2002 |

OTHER PUBLICATIONS

International Search Report dated Aug. 31, 2010, issued for PCT/JP2010/060444.

* cited by examiner

ENGINE SYSTEM IN WHICH TRANSFORMER IS ARRANGED IN INDEPENDENT VENTILATION PATH

TECHNICAL FIELD

The present invention relates to an engine system in which a transformer is disposed in an independent ventilation path.

BACKGROUND ART

As conventionally well-known power generation systems, there is a package-housed engine generator in which an engine, a generator, and other necessary devices are housed in a package, and a gas turbine cogeneration package in which a gas turbine, a generator, and other necessary devices are housed in a package. Moreover, in a gas turbine cogeneration package, a transformer is disposed on the first-level floor space (e.g., see PTL 1).

In the gas turbine cogeneration package disclosed in PTL 1, devices such as the transformer, the gas turbine, and the generator generate heat during operation, and therefore the space inside the package that houses these devices needs to be ventilated in order to be able to cool the devices. For this reason, gas turbine cogeneration packages and the like have been designed with consideration given to the thermal balance of the whole package including the transformer from the time of manufacturing.

CITATION LIST

Patent Literature

PTL 1: JP 2002-4942A

SUMMARY OF INVENTION

Technical Problem

However, in the case where, for example, an engine system whose electrical devices have a 200 V specification (expected voltage) is used with a 400 VAC power supply, a transformer for conversion to 200 V needs to be separately added within the package.

In this way, in the case where the voltage of the AC power supply that is actually used differs from the expected voltage, when a transformer is disposed in the same ventilation path as the other devices as with the configuration in PTL 1, the heat capacity in the package changes, and therefore the thermal balance needs to be re-designed.

In view of this, the present invention provides an engine system in which even in the case where a transformer is added in order for the engine system to be used with an AC power supply that differs from the expected voltage of the electrical devices, there is substantially no change in the thermal balance in the package due to the presence or absence of the transformer.

Solution to Problem

The present invention has been achieved in order to solve the aforementioned problems. In the present invention, in an engine system in which an engine and an electrical device for driving the engine system are housed in a package, in order for a transformer whose primary side is an AC power supply and whose secondary side is an expected voltage of the electrical device for driving the engine system to be housed in the package, the transformer is attached to an inner face of a package outer panel forming a part of an outer wall of the package, openings are provided respectively above and below the transformer in the package outer panel, the opening below the transformer, the opening above the transformer, the transformer, and a ventilation fan are housed in and covered by a transformer box that is a common space sectioned off from a space in which another device is housed inside the package, the transformer box being provided on the inner face of the package outer panel, a ventilation duct is provided on an outer face of the package outer panel so as to cover a range from the opening above the transformer to the opening below the transformer, and the interior of the ventilation duct is sectioned into an intake portion in communication with the opening below the transformer and the outside and an exhaust portion in communication with the opening above the transformer and the outside such that the transformer, the ventilation fan, and a ventilation path for the transformer are consolidated on a single package outer panel.

According to the present invention, in order for the addition of a transformer for converting the AC power supply voltage, an intake port, an exhaust port, and a ventilation fan for cooling the transformer are provided in a ventilation path that is independent from other devices, thus enabling realizing an engine system in which there is substantially no change in the thermal balance in the package due to the presence or absence of the transformer.

Note that given that a transformer is a heat generating body, it is conceivable that the thermal balance in the package will slightly change from that at the time of manufacturing if a transformer is added, and therefore "substantially" means the extent that there is no need for re-setting of the thermal balance.

In the engine system of the present invention, a plurality of transformers may be provided, the transformers may be stacked in a height direction, and a ventilation path may be provided around the entire circumference of the transformers.

According to this configuration of the present invention, the installation area of the transformer can be reduced, and the cooling efficiency of the transformer can be improved.

In the engine system of the present invention, a sealing member may be provided on a peripheral part at a top edge and left and right side edges on a face where the ventilation duct and the package are attached, and gutters may be respectively provided at a top edge of the openings above and below the transformer in the package.

This configuration of the present invention enables preventing the infiltration of rainwater into the transformer in the package.

In the engine system of the present invention, the transformer may be provided with a temperature sensor, and output performance may be suppressed to a predetermined value in a case where a detected temperature of the temperature sensor is greater than or equal to a predetermined temperature.

According to this configuration of the present invention, in the case where the temperature of the transformer is greater than or equal to the predetermined temperature, the power amount to be generated is reduced so as to lower the temperature of the transformer and achieve protection from overheating of the transformer.

In the engine system of the present invention, operation may be stopped if the detected temperature of the temperature sensor is greater than or equal to a second predetermined temperature that is higher than the predetermined temperature.

According to this configuration of the present invention, protection from overheating of the transformer is achieved in the case where the reduction of the temperature of the transformer is insufficient.

In the engine system of the present invention, the transformer may be provided with a temperature switch, and at a third predetermined temperature that is higher than the second predetermined temperature, the temperature switch may operate and reception of power from the AC power supply may be cut off.

According to this configuration of the present invention, greater protection from overheating of the transformer is achieved.

Advantageous Effects of Invention

According to the present invention, in order for the addition of a transformer for converting the AC power supply voltage, an intake port, an exhaust port, and a ventilation fan for cooling the transformer are provided in a ventilation path that is independent from other devices, thus enabling realizing an engine system in which there is substantially no change in the thermal balance in the package due to the presence or absence of the transformer.

Figure 1:
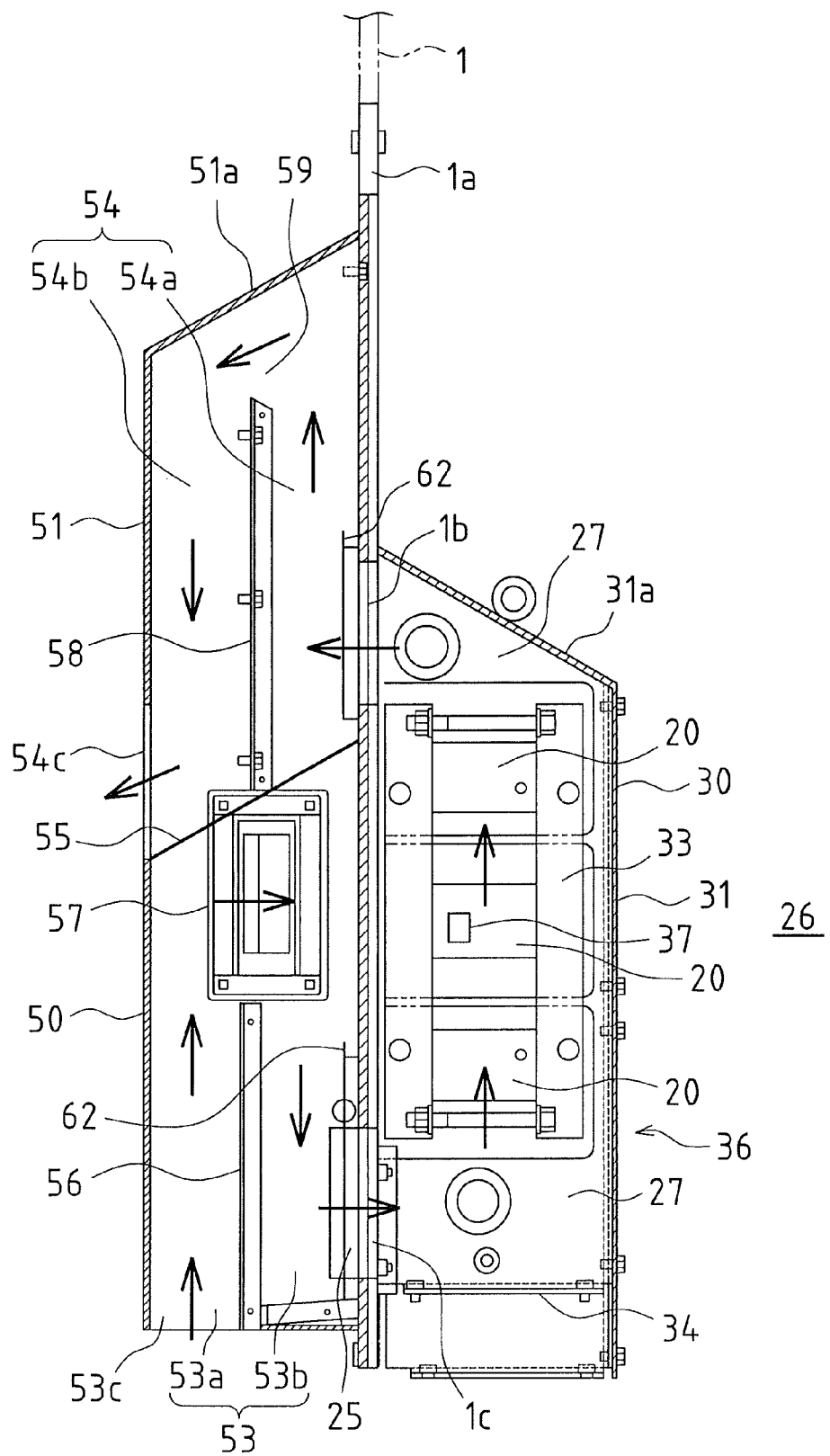
FIG. 1 is a cross-sectional side view of relevant parts of an engine system according to an embodiment of the present invention.
Figure 2:
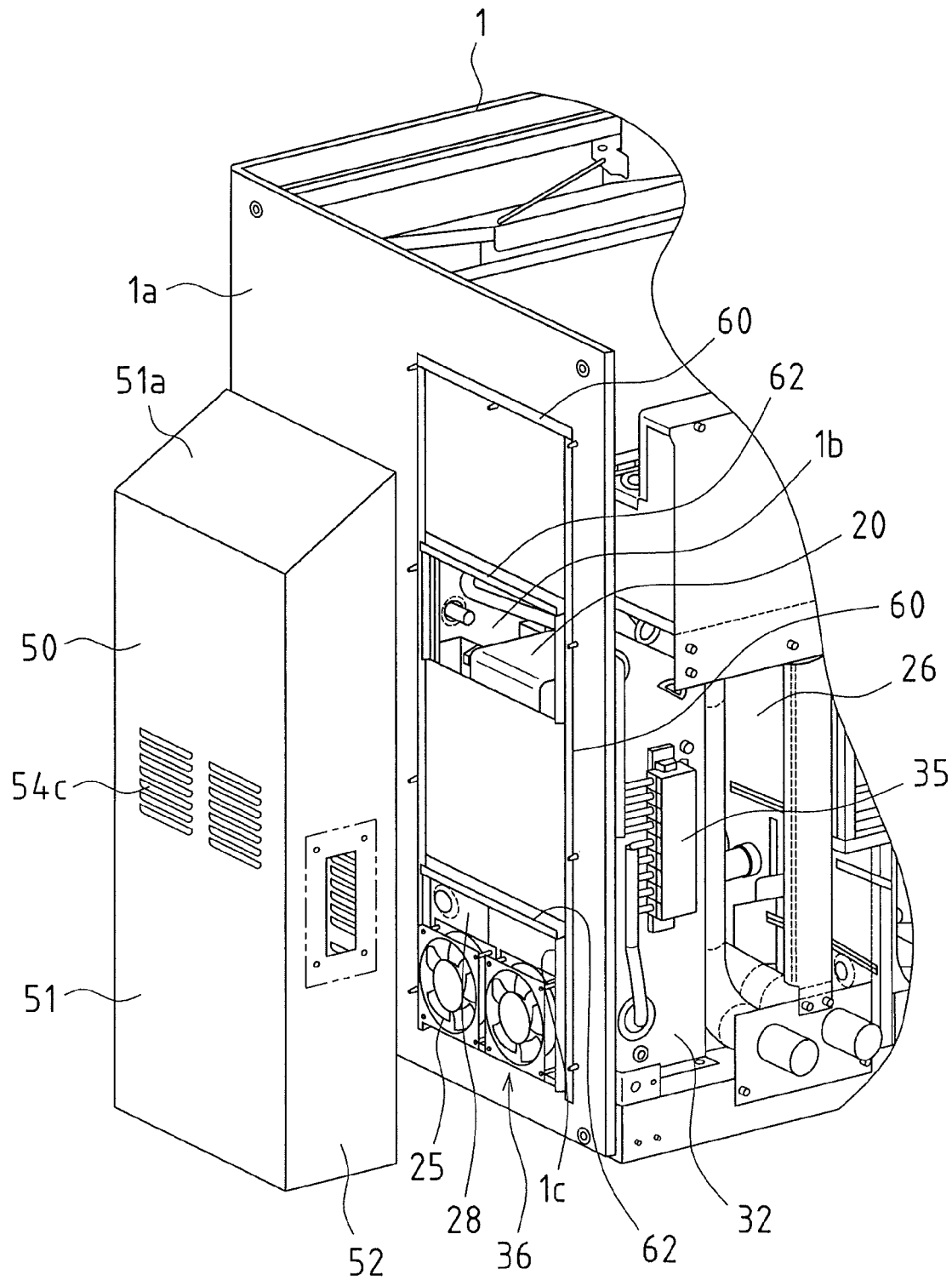
FIG. 2 is an exploded perspective view of relevant parts of the engine system.
Figure 3:
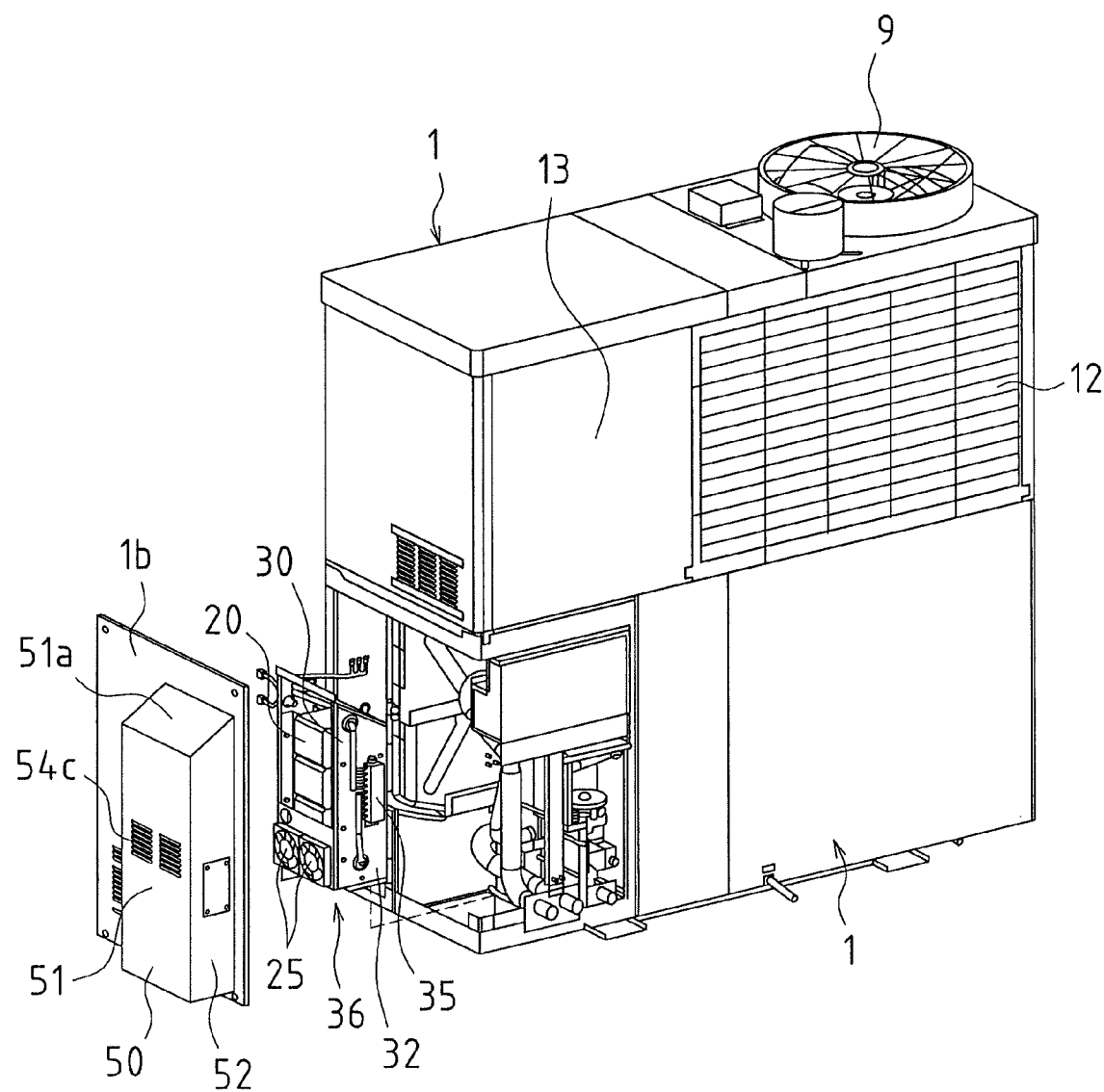
FIG. 3 is an overall exploded perspective view of the engine system.

REFERENCE SIGNS LIST 1 package
1a package outer panel
1b opening above transformer
1c opening below transformer
2 gas engine (engine)
3 generator
5 ventilation fan
9 propeller fan
13 inverter
20 transformer (autotransformer)
25 ventilation fan
26 space
27 space
30 transformer box
35a ventilation path
35b ventilation path
35c ventilation path
35 terminal
36 transformer unit
37 temperature sensor 50 ventilation duct
60 sealing member
62 gutter

DESCRIPTION OF EMBODIMENTS

An embodiment of the present invention will be described below with reference to the drawings. FIGS. 1 to 9 show an embodiment of the present invention.

Figure 7:
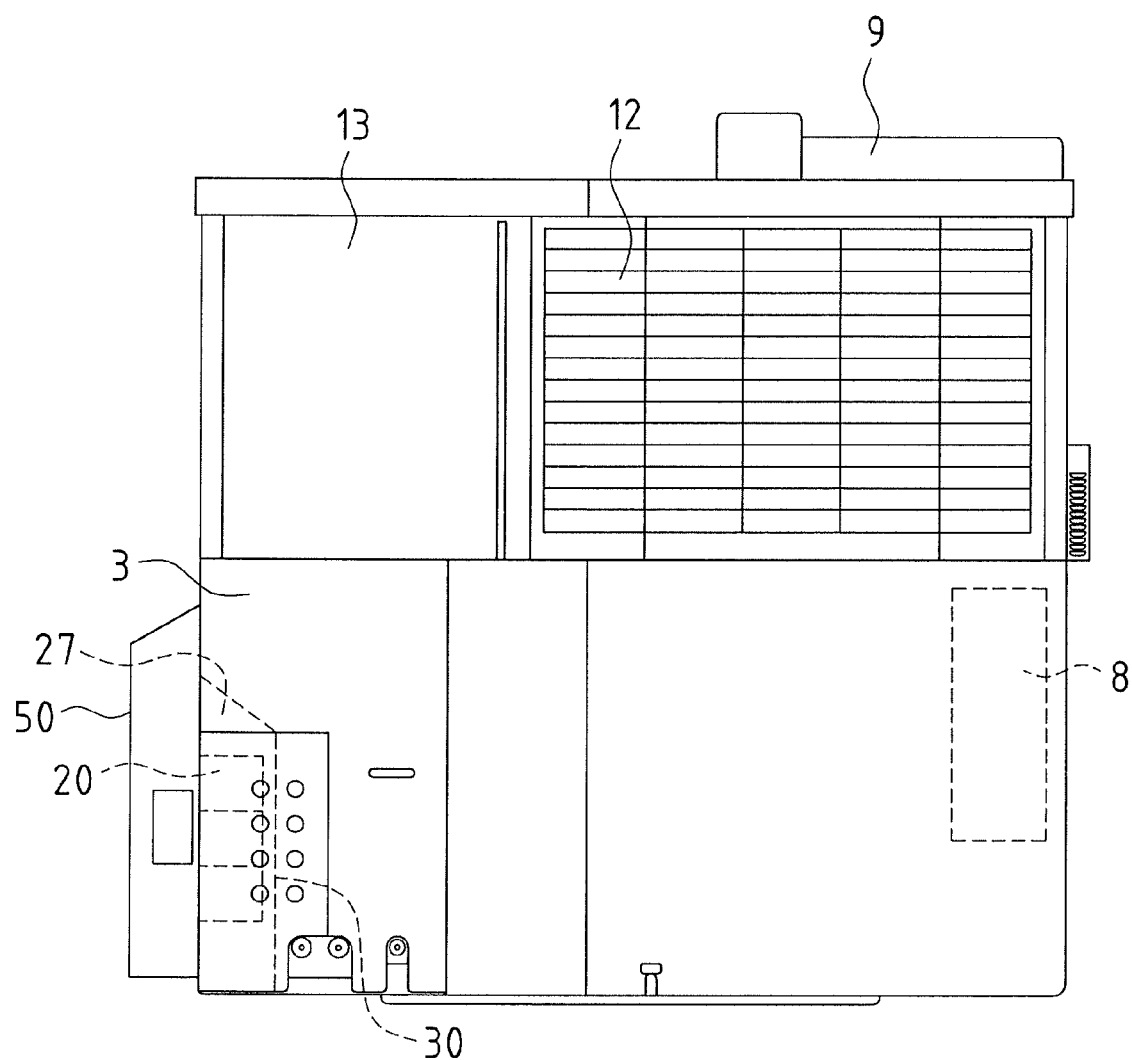
FIG. 7 is an overall front view of the engine system according to the embodiment of the present invention.
Figure 8:
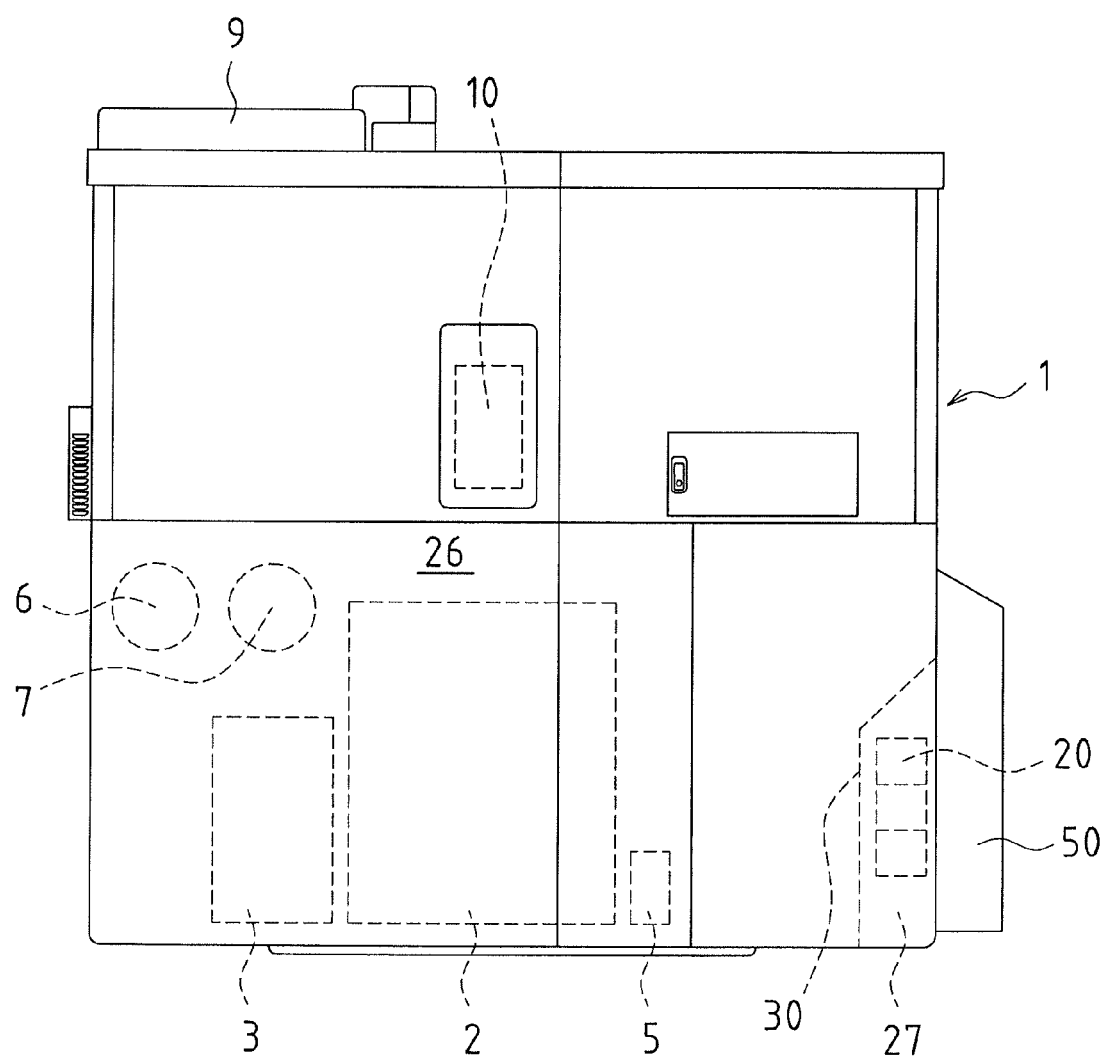
FIG. 8 is an overall back view of the engine system.
Figure 9:
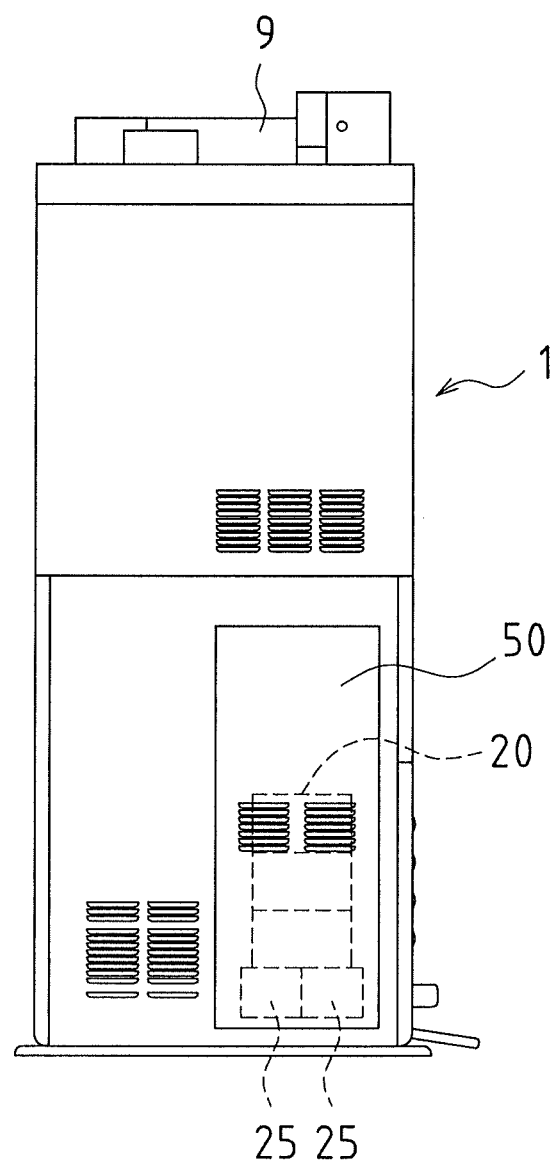
FIG. 9 is an overall side view of the engine system.

FIG. 7 is an overall front view of a cogeneration apparatus as an engine system of the embodiment of the present invention, FIG. 8 is an overall back view of the cogeneration apparatus, and FIG. 9 is an overall side view of the cogeneration apparatus.

The cogeneration apparatus of the present embodiment includes a gas engine 2 that uses natural gas as fuel, a generator 3 that is driven by the gas engine 2, a ventilation fan 5, an air cleaner 6, an intake silencer 7, a starter (not shown), and an exhaust silencer 8, which are in the lower portion of a package 1 that is grounded.

Also, a propeller fan 9, a coolant tank 10, a radiator 12, and an inverter 13 are disposed in the upper portion of the package 1.

As shown in FIGS. 1 to 5, an autotransformer 20 is disposed on one side in the package 1. The autotransformer 20 is a transformer with an AC power supply on the primary side and the expected voltage of electrical devices for driving the cogeneration apparatus on the secondary side. For example, the AC power supply on the primary side is a 400 VAC power supply, and the expected voltage on the secondary side necessary in the cogeneration apparatus for operating the gas engine 2 is a 200 VAC power supply.

Openings 1b and 1c are respectively provided above and below the transformer 20 in a package outer panel 1a forming part of the outer wall of the package 1.

Also, the opening 1b above the transformer, the transformer 20, and the opening 1c below the transformer are housed in a common space 27 that is sectioned off from a space 26 in which other devices are housed inside the package 1. Specifically, a transformer box 30 is provided on the inner side of the package outer panel 1a so as to cover the openings 1b and 1c and the transformer 20.

The transformer box 30 is configured from a back face part 31 having an inclined part 31a at the top, side wall parts 32 on respective sides, and a sealing bottom panel 34. Note that it is possible to omit the provision of the sealing panel 34 at the lower end of the transformer box 30, and seal the lower end of the transformer box 30 using the floor face of the package 1.

Ventilation fans 25 are attached via a fan attachment panel 28 to the lower portion of the open front face of the transformer box 30. Also, the ventilation fans 25 face the opening 1c below the transformer.

Figure 4:
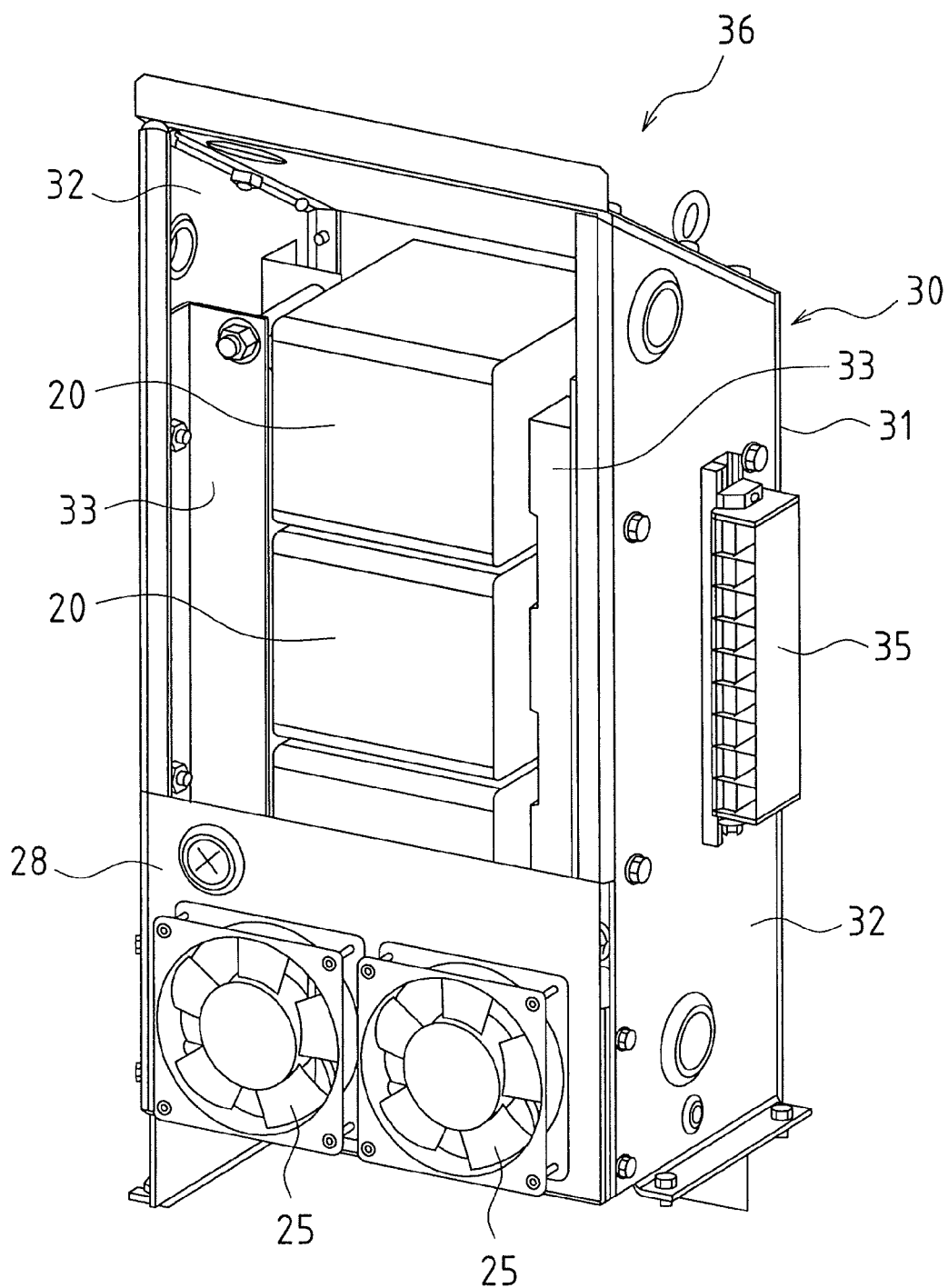
FIG. 4 is a perspective view of a transformer unit used in the engine system.
Figure 5:
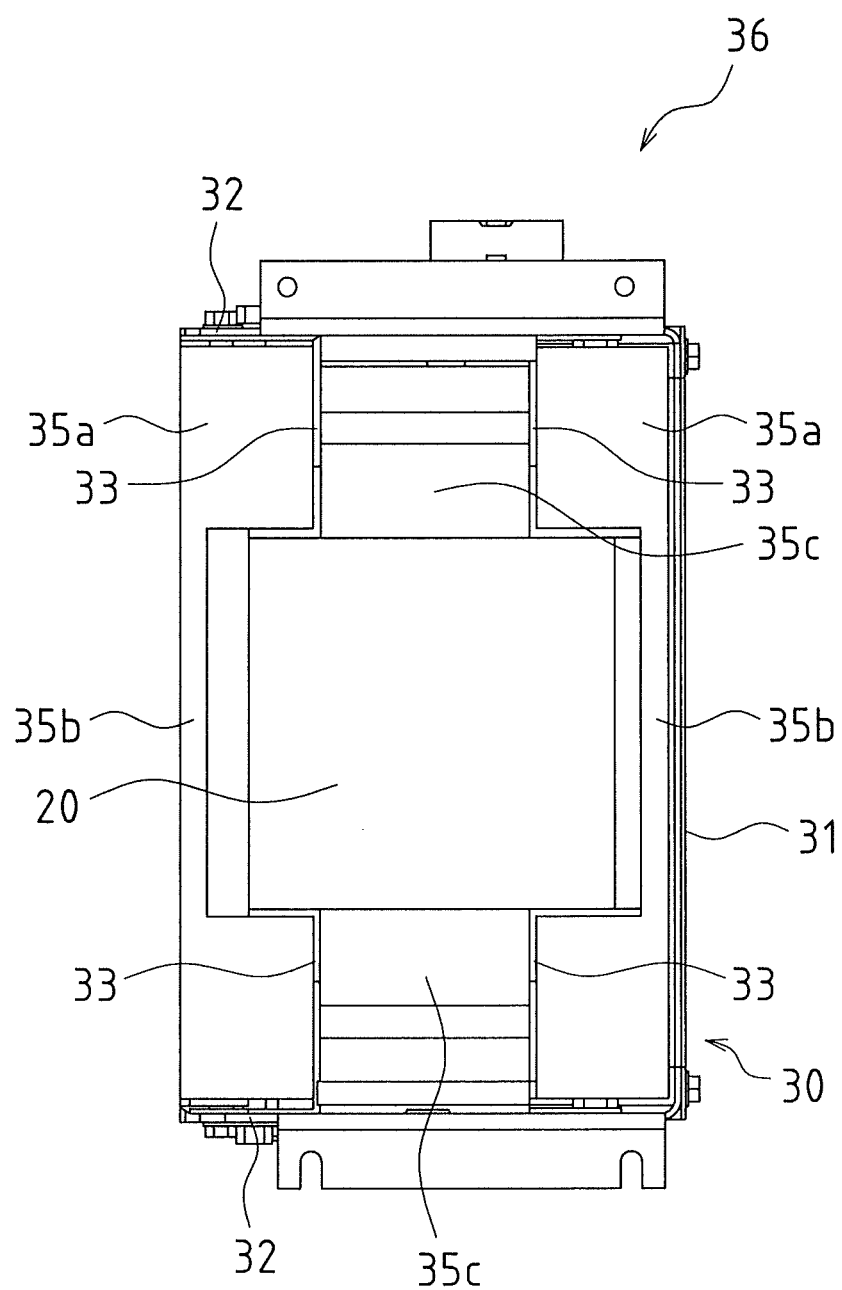
FIG. 5 is a bottom view of the interior of the transformer unit.
Figure 6:
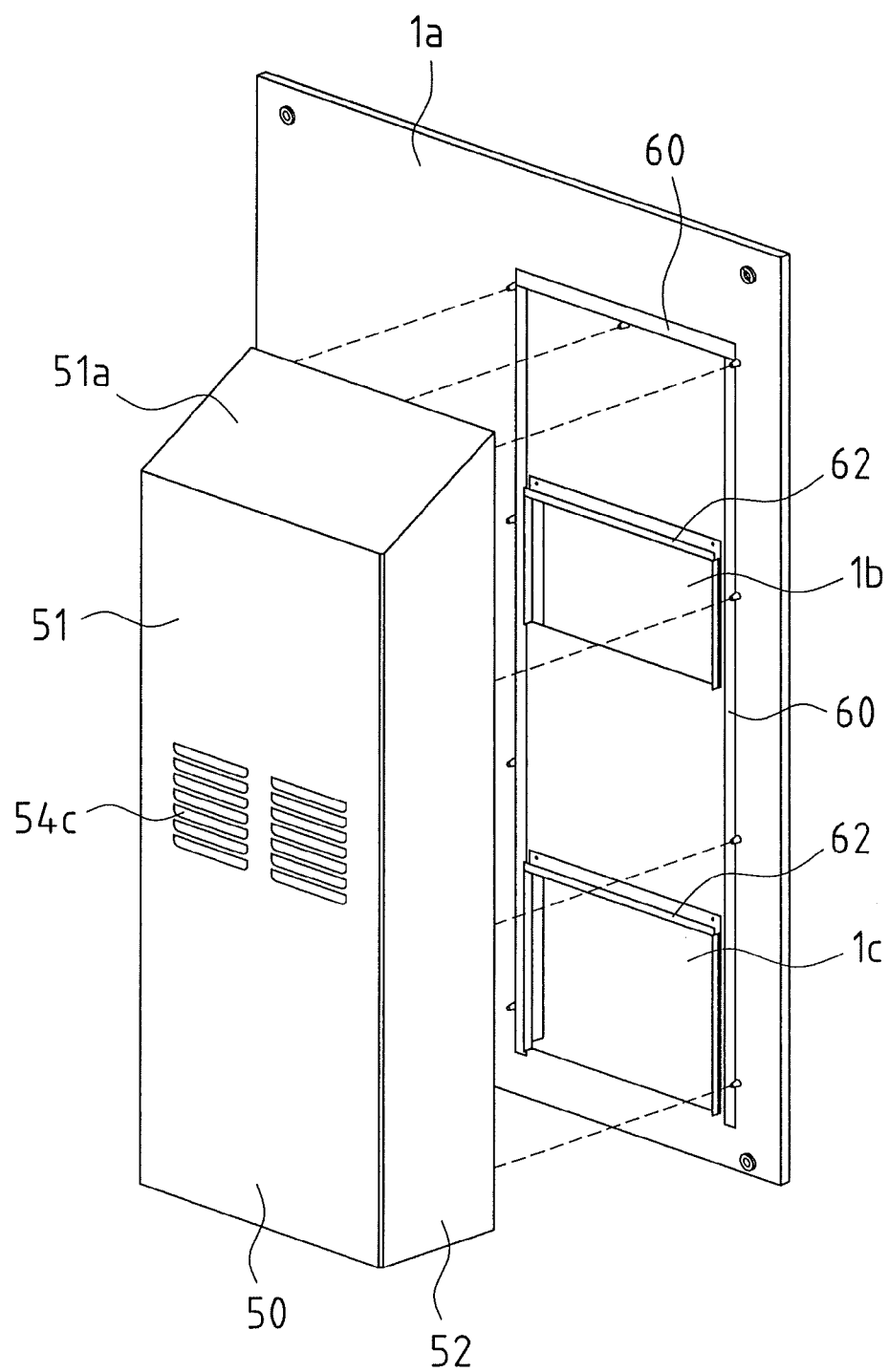
FIG. 6 is a perspective view of the state in which a ventilation duct is separated from a package outer panel.

Multiple (in the present embodiment, three) transformers 20 are stacked in the height direction and, as shown in FIGS. 4 and 5, are fixed to the side wall parts 32 of the transformer box 30 via stays 33. In this way, by fixing the transformers 20 to the side wall parts 32 of the transformer box 30 via the stays 33, the transformers 20 can be fixed so as to have a gap between them and the inner face of the transformer box. In this way, by fixing the transformers 20 so as to have a gap between them and the inner face of the transformer box, ventilation paths 35a, 35b, and 35c are formed between the inner face of the transformer box and the entire circumference of the transformers 20 (see FIG. 5).

The lower ends of the ventilation paths 35a, 35b, and 35c are in communication with the opening 1c below the transformers via the ventilation fans 25, and the upper ends of the ventilation paths 35a, 35b, and 35c are in communication with the upper opening 1b. Note that a transformer unit 36 is configured by the transformer box 30, the transformers 20, and the ventilation fans 25.

Also, a ventilation duct 50 is provided on the outer face of the package outer panel 1a so as to cover a range from the opening 1b above the transformers to the ventilation fans 25 (the opening 1c below the transformers). This ventilation duct 50 is configured from a front wall 51 that has an inclined part 51a at the top, and two side walls 52. The ventilation duct 50 is open on the outer face side of the package outer panel, but this opening is sealed by the package outer panel 1a.

The interior of the ventilation duct 50 is sectioned into an intake portion 53 that is in communication with the opening 1c below the transformers and an exhaust portion 54 that is in communication with the opening 1b above the transformers. Specifically, the interior of the ventilation duct 50 is vertically bisected via a sectioning wall 55, the lower space serves as the intake portion 53, and the upper space serves as the exhaust portion 54.

Moreover, the intake portion 53 and the exhaust portion 54 are horizontally bisected by vertical dividing walls 56 and 58 as shown in FIG. 1, and thus the interior of the ventilation duct 50 is overall divided into four sections. The dividing wall 56 divides the intake portion 53 into an upstream intake path 53a that has an intake port 53c in communication with the outside, and a downstream intake path 53b that is in communication with the ventilation fans 25. Also, a filter 57 is provided at the upper end of the dividing wall 56, and the upstream intake path 53a and the downstream intake path 53b are in communication with each other via the filter 57. Note that the lower face of the downstream intake path 53b is sealed.

The dividing wall 58 divides the exhaust portion 54 into an upstream exhaust path 54a that is in communication with the opening 1b above the transformers, and a downstream exhaust path 54b that is in communication with the outside. Also, a gap 59 is formed between the upper end of the dividing wall 58 and the inclined part 51a of the ventilation duct 50, and the upstream exhaust path 54a and the downstream exhaust path 54b are in communication with each other via the gap 59. Note that an exhaust port 54c of the upstream exhaust path 54a is formed in the front wall 51 of the ventilation duct 50.

Also, a sealing member 60 is provided on a peripheral part at the top edge and the left and right side edges on the face where the ventilation duct 50 and the package outer panel 1a are attached. In the present embodiment, the sealing member 60 is provided on the outer face of the package outer panel 1a so as to conform to the three edges of the inclined part 51a and the two side walls 52 of the ventilation duct 50. Also, the circumferential edge of the opening of the ventilation duct 50 is in close contact with the sealing member 60, thus maintaining water-tightness between the ventilation duct 50 and the package 1.

Also, gutters 62 are respectively provided along the entire length of the top edge of the opening 1b above the transformers and the opening 1c below the transformers. Either side of each gutter 62 is inclined, or the center is raised and the two end sides are lowered. Due to these gutters 62, even if rainwater flows along the package outer panel 1a, it is possible to prevent the rainwater from infiltrating the package 1 through the opening 1b above the transformers and the opening 1c below the transformers.

Furthermore, a terminal 35 for connection with the primary side or secondary side of the transformers 20 is provided in one of the side wall parts 32 of the transformer box 30.

Moreover, the transformers 20 are provided with a temperature sensor 37 as shown in FIG. 1. In the case where the temperature detected by the temperature sensor 37 is greater than or equal to a predetermined temperature, control of the gas engine 2 and the like is performed in order to suppress the output (power) performance to a predetermined value. Moreover, in the case where the temperature detected by the temperature sensor 37 is greater than or equal to a second predetermined temperature that is higher than the aforementioned predetermined temperature, operation is stopped.

Furthermore, the transformers 37 are provided with a temperature switch (not shown), and when a third predetermined temperature that is higher than the second predetermined temperature has been reached, the temperature switch operates so as to enable cutting off the reception of power from the AC power supply.

The cogeneration apparatus of the present embodiment has the above configuration, and the following describes a case of operating this apparatus.

First, the gas engine 2 is started, and power is generated by the generator 3. This generated power is generated as a 200 VAC power supply by an inverter, and part of the power is supplied to various electrical devices in order to operate the gas engine 2. Since the ventilation fan 5 and the propeller fan 9 are also operated using the 200 VAC power supply, outside air enters the interior space 26 from the lower portion of the package 1 through an intake port provided in an appropriate portion of the package 1, and after various devices such as the gas engine 2 and the generator 3 have been cooled, the air flows to the upper portion of the package 1 and is discharged via the propeller fan 9. Also, the majority of the generated AC power supply is converted into 400 V voltage by the transformers 20 and can be appropriately supplied to the outside.

In this way, since the majority of the 200 VAC power supply that was generated passes through the transformers 20, the transformers 20 generate heat. The ventilation fans 25 also operate using the 200 VAC power supply. As a result, outside air is sucked into the upstream intake path 53a through the intake port 53c of the ventilation duct 50. The air that entered the upstream intake path 53a flows upward and furthermore passes through the filter 57. The air that passed through the filter 57 changes direction, flows downward in the downstream intake path 53b, and is sucked in by the ventilation fans 25.

The air that passed through the ventilation fans 25 furthermore enters the lower portion of the common space 27 in the transformer box 30, and flows upward in the common space 27. Specifically, the air flows upward in the ventilation paths 35a, 35b, and 35c, and therefore the air cools the transformers 20.

The air that cooled the transformers 20 enters the upstream exhaust path 54a through the opening 1b above the transformers, and furthermore flows upward. This air enters the downstream exhaust path 54b via the gap 59, flows downward, and is then discharged from the exhaust port 54c.

As described above, the ventilation path that cools various devices for operating the engine other than the transformers 20 and the ventilation paths that cool the transformers 20 are configured so as to be sectioned off. As a result, independent ventilation paths that cool the transformers 20 are provided in the transformer unit 36, and added transformers 20 are cooled by air that flows in these ventilation paths. As a result, ventilation for existing portions such as other devices like the engine and the generator 3 is the same regardless of the presence or absence of the transformers 20, and thus the other devices such as the engine are not influenced by the presence or absence of the transformers 20.

Also, since multiple transformers 20 are disposed so as to be stacked vertically, and the ventilation paths 35a, 35b, and 35c are provided around the entire circumference of the transformers 20, ventilation can be performed efficiently.

Furthermore, since the transformer unit 36 is configured by the transformers 20 being housed in the transformer box 30, appropriate transformers 20 can be easily and swiftly attached in accordance with the site where the cogeneration apparatus is to be installed, without changing the existing device.

Also, the intake portion 53 and the exhaust portion 54 are provided in the ventilation duct 50, the intake portion 53 is divided into the upstream intake path 53a and the downstream intake path 53b, the exhaust portion 54 is divided into the upstream exhaust path 54a and the downstream exhaust path 54b, and the ventilation path is curved, and therefore there is no risk of rainwater infiltrating the package 1 via the intake portion 53 and the exhaust portion 54.

The present invention is not intended to be limited to the above-described embodiment. For example, in the present embodiment, the ventilation fans 25 may be provided in the opening 1b above the transformers, and there are no particular limitations on the installation location as long as the common space 27 can be ventilated.

Also, although a gas engine has been given as an example of the engine, the engine may be another type that is driven by other fuel such as a diesel engine. Moreover, although a cogeneration apparatus was described, the present invention can also be employed in a GHP (gas heat pump).

The present invention can be embodied in various other forms without departing from the spirit or main features of the invention. The above-described embodiment is therefore merely exemplary in all respects, and is not intended to be interpreted in a limiting manner. The scope of the present invention is indicated by the scope of the claims, and is not intended to be restricted to this specification in any way. Furthermore, all variations and modifications within the scope equivalent to the scope of the claims are encompassed in the scope of the present invention.

Note that this application claims priority based on JP 2009-196583A submitted in Japan on Aug. 27, 2009. The contents thereof are herein incorporated in the present application by reference.

INDUSTRIAL APPLICABILITY

The present invention is useful to an engine system in which a transformer is disposed in an independent ventilation path. In particular, the present invention can be applied to the prevention of a substantial change in the thermal balance in a package due to the presence or absence of a transformer.

The invention claimed is:

1. An engine system in which an engine and an electrical device for driving the engine system are housed in a package, comprising:

a transformer with a primary side coupled to an AC power supply and a secondary side which outputs an expected voltage of the electrical device for driving the engine system, the transformer housed in the package and attached to an inner face of a package outer panel forming a part of an outer wall of the package, openings are provided respectively above and below the transformer in the package outer panel, the opening below the transformer, the opening above the transformer, the transformer, and a ventilation fan are housed in and covered by a transformer box that is a common space sectioned off from a space in which another device is housed inside the package, the transformer box being provided on the inner face of the package outer panel, a ventilation duct is provided on an outer face of the package outer panel so as to cover a range from the opening above the transformer to the opening below the transformer, and the interior of the ventilation duct is sectioned into an intake portion in communication with the opening below the transformer and the outside and an exhaust portion in communication with the opening above the transformer and the outside such that the transformer, the ventilation fan, and a ventilation path for the transformer are consolidated on a single package outer panel.

2. The engine system according to claim 1, wherein a plurality of transformers are provided, the transformers are stacked in a height direction, and a ventilation path is provided around the entire circumference of the transformers.

3. The engine system according to claim 1, wherein a sealing member is provided on a peripheral part at a top edge and left and right side edges on a face where the ventilation duct and the package are attached, and gutters are respectively provided at a top edge of the openings above and below the transformer in the package.

4. The engine system according to claim 1, wherein the transformer is provided with a temperature sensor, and output performance is suppressed to a predetermined value in a case where a detected temperature of the temperature sensor is greater than or equal to a predetermined temperature.

5. The engine system according to claim 4, wherein operation is stopped if the detected temperature of the temperature sensor is greater than or equal to a second predetermined temperature that is higher than the predetermined temperature.

6. The engine system according to claim 5, wherein the transformer is provided with a temperature switch, and at a third predetermined temperature that is higher than the second predetermined temperature, the temperature switch operates and reception of power from the AC power supply is cut off.

* * * * *